United States Patent
Golander et al.

(10) Patent No.: US 10,983,955 B2
(45) Date of Patent: Apr. 20, 2021

(54) DATA UNIT CLONING IN MEMORY-BASED FILE SYSTEMS

(71) Applicant: NETAPP, INC., Sunnyvale, CA (US)

(72) Inventors: Amit Golander, Tel Aviv (IL); Sagi Manole, Petah Takva (IL); Boaz Harrosh, Tel Aviv (IL)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 16/904,346

(22) Filed: Jun. 17, 2020

(65) Prior Publication Data

US 2020/0320036 A1    Oct. 8, 2020

Related U.S. Application Data

(63) Continuation of application No. 15/630,453, filed on Jun. 22, 2017, now Pat. No. 10,719,479.

(60) Provisional application No. 62/355,373, filed on Jun. 28, 2016.

(51) Int. Cl.
*G06F 16/13* (2019.01)
*G06F 16/178* (2019.01)
*G06F 16/27* (2019.01)
*G06F 16/22* (2019.01)
(Continued)

(52) U.S. Cl.
CPC .............. *G06F 16/13* (2019.01); *G06F 3/065* (2013.01); *G06F 3/0619* (2013.01); *G06F 3/0679* (2013.01); *G06F 16/178* (2019.01); *G06F 16/2246* (2019.01); *G06F 16/275* (2019.01); *G06F 16/9024* (2019.01)

(58) Field of Classification Search
CPC ...... G06F 16/13; G06F 16/178; G06F 16/275; G06F 16/2246; G06F 16/9024; G06F 3/0619; G06F 3/065; G06F 3/0679
See application file for complete search history.

(56) References Cited

U.S. PATENT DOCUMENTS

| | | | |
|---|---|---|---|
| 8,898,668 B1 * | 11/2014 | Costea | G06F 8/65 718/100 |
| 9,460,177 B1 | 10/2016 | Pawar et al. | |
| 10,216,757 B1 | 2/2019 | Armangau et al. | |
| | (Continued) | | |

OTHER PUBLICATIONS

Final Office Action dated Nov. 1, 2019 for U.S. Appl. No. 15/630,392, filed Jun. 22, 2017, 15 pages.
(Continued)

*Primary Examiner* — Robert W Beausoliel, Jr.
*Assistant Examiner* — Mohammad Solaiman Bhuyan
(74) *Attorney, Agent, or Firm* — Klein, O'Neill & Singh, LLP

(57) ABSTRACT

A data structure used in memory-based file system, method and apparatus using thereof. The data structure comprising: a tree of the nodes comprising tree nodes and leaf nodes, each tree node points to at least one node, each leaf node is associated with a plurality of data unit elements each of which representing a data unit, wherein each data unit element is associated with two pointers, wherein at least one of the two pointers is capable of pointing to a data unit or to a data unit element; and a cyclic linked list of data unit elements representing identical clones of a data unit, wherein the cyclic linked list comprises a first element pointing directly to the data unit, wherein from each element in the cyclic linked list, the data unit can be reached in time complexity of O(1).

20 Claims, 10 Drawing Sheets

(51) Int. Cl.
   *G06F 16/901*      (2019.01)
   *G06F 3/06*        (2006.01)

(56)            References Cited

U.S. PATENT DOCUMENTS

| | | |
|---|---|---|
| 2005/0065986 A1 | 3/2005 | Bixby et al. |
| 2008/0059952 A1* | 3/2008 | Van Huben ............. G06F 16/27 |
| | | 717/120 |
| 2012/0130949 A1 | 5/2012 | Picken et al. |
| 2016/0246521 A1* | 8/2016 | Dewitt ................. G06F 3/0688 |
| 2016/0328488 A1 | 11/2016 | Lytle |
| 2016/0350006 A1 | 12/2016 | Wang et al. |
| 2016/0350325 A1 | 12/2016 | Wang et al. |
| 2017/0060898 A1 | 3/2017 | Lu et al. |
| 2017/0371912 A1 | 12/2017 | Kimura |

OTHER PUBLICATIONS

Notice of Allowance on co-pending U.S. Appl. No. 15/630,392 dated Feb. 13, 2020, 10 pages.
Non-Final Office Action dated Jun. 4, 2019 for U.S. Appl. No. 15/630,392, filed Jun. 22, 2017, 9 pages.

* cited by examiner

DATA UNIT CLONING IN MEMORY-BASED FILE SYSTEMS

CROSS-REFERENCE TO RELATED APPLICATION

This patent application claims priority of and is a continuation of U.S. patent application Ser. No. 15/630,453, filed Jun. 22, 2017, which claims the benefit of U.S. Provisional Application No. 62/355,373 filed Jun. 28, 2016, entitled Efficient Copy-on-Write in memory-based file system, the disclosure which are incorporated herein by reference in their entirety.

TECHNICAL FIELD

The present disclosure relates to a data cloning in file systems in general, and to efficient data cloning in memory-based file system, in particular.

BACKGROUND

File storage is traditionally implemented as non-volatile block-based storage media such as magnetic hard-disk drive (HDD), Flash-based solid-state drive (SSD) or Flash-based non-volatile memory SSD (NVMe), and employed as a peripheral device to one or more computing devices. Such technologies provide affordable capacity, but at latency longer in many orders of magnitudes as compared to the latency of volatile memory such as dynamic random-access memory (DRAM).

Newly developed storage media technologies are currently becoming available, which overcome this problem. For example, a Non-Volatile Dual In-line Memory Module (NVDIMM) is a computer random access memory (RAM) that retains data even when electrical power is stopped due to normal system shutdown, an unexpected power loss, system crash or any other reason. Currently the main type of available NVDIMM cards include: NVDIMM-N which is a byte-addressable memory-mapped device, typically comprised of capacitor or battery backed DRAM and responds at memory speeds. Several storage-class memory-based NVDIMMs are planned to reach the market around 2018, these for example include MRAM, 3DXPoint™ and ReRAM based NVDIMMs planned by vendors such as Everspin™, Intel™, Western Digital™ and Sony™.

Traditional file systems and storage solutions rely on a block Application Program Interface (API). Emerging NVDIMMs technologies are faster, but their impact can extend to changing the mode of operation. Their byte addressability further opens an opportunity to optimize the entire algorithm, not just run the same ones faster.

Light-weight clones and Copy-on-write (CoW) is a technique that may be used to implement clones, snapshots, backup, disaster recovery, de-duplication, cloud offload and other features. CoW is a space and time efficiency optimization strategy that takes advantage of the fact that it is not necessary to immediately create a new copy of that information. Instead a link to the same data is created, with the provision that on the first occasion in which one of the logical copies needs to be modified, space for the different copy is allocated and modified on demand. When there are many separate processes all using the same large data structure, each with a small likelihood of having to modify it at all, or to modify only a small part of it, then it is possible to make significant resource savings by sharing physical space across logical copies.

BRIEF SUMMARY

One exemplary embodiment of the disclosed subject matter is a data structure used in a file system wherein the data structure is retained in a non-transitory computer readable storage medium, wherein a content of each object of the file system is retained in data units, the data structure comprising: a tree of the nodes comprising tree nodes and leaf nodes, wherein each tree node points to at least one node, wherein each leaf node is associated with a plurality of data unit elements each of which representing a data unit, wherein each data unit element is associated with two pointers, wherein at least one of the two pointers is capable of pointing to a data unit or to a data unit element; a cyclic linked list of data unit elements representing identical clones of a data unit, wherein the cyclic linked list comprises a first element associated with a first pointer pointing directly to the data unit and a second pointer pointing to a second element in the cyclic linked list, wherein from each element in the cyclic linked list, the data unit can be reached in time complexity of O(1).

Optionally, each element in the cyclic linked list other than the first element is associated with a pointer pointing to the first element, whereby from each element of the cyclic linked list, the data unit is reachable via traversal of no more than two pointers.

Optionally, each element in the cyclic linked list is associated with a pointer pointing directly to the data unit, whereby from each element of the cyclic linked list, the data unit is reachable via traversal of no more than one pointer.

Optionally, each element in the cyclic linked list is comprised by a single leaf node.

Optionally, the each leaf node comprises the plurality of data unit elements.

Optionally, the first element is associated with a second pointer pointing to a second element of the cyclic linked list, wherein a portion of the cyclic linked list comprising all elements of the cyclic linked list other than the first element, forms a cyclic linked list.

Optionally, the first element is associated with a second pointer pointing to a second element of the cyclic linked list, wherein a portion of the cyclic linked list comprising all elements of the cyclic linked list other than the first element forms a non-cyclic linked list, wherein the second element is a head element of the non-cyclic linked list.

Optionally, the file system is a multi-tier file system comprising a first tier and a second tier, wherein the first tier having larger capacity than a capacity of the second tier, wherein each data unit element comprises a first tier pointer (t1) and a second tier pointer (t2).

Optionally, the t1 of the first element is utilized, when not used to point to a data unit, to point to the second element.

Optionally, for each element other than the first element one pointer of the t1 and the t2 points to the first element, wherein another pointer of the t1 and the t2 is configured to point to another element of the cyclic linked list other than the first element.

Optionally, the another pointer of each element other than the first element is used to form a non-cyclic linked list beginning at the second element and ending at a tail element, wherein the another pointer of the tail element comprises a null value, whereby the cyclic linked list is formed of the non-cyclic linked list, the one pointer of the tail element pointing to the first element, and the second pointer of the first element pointing to the second element.

Optionally, wherein for each element other than the first element, the t1 points directly to the data unit and the t2 points to a successive element of the cyclic linked list other than the first element.

Another exemplary embodiment of the disclosed subject matter is a method for creating a modified clone based on an existing clone, wherein the method is performed based on the multi-tier file system, wherein the existing clone is represented by a clone data unit element, wherein the clone data unit element is part of the cyclic linked list, wherein the data unit associated with the clone data unit element is retained in duplicate copies, one in the first tier and another in the second tier, wherein the first tier is accessible via the t1, wherein the second tier is accessible via the t2, the method comprising performing a split-on-write operation, wherein said performing comprises: removing the clone data unit element from the cyclic linked list; removing a first copy of the duplicate copies from being used by the cyclic linked list; and pointing from the clone data unit element to the first copy, whereby the first copy is used for the modified clone and a second copy of the duplicate copies continues to be used by non-modified clones.

Optionally, comprising determining, based on a heuristic, to employ the split-on-write operation.

Optionally, the heuristic is selected from a list consisting of: a first heuristic that is based on availability of tier one data units; and a second heuristic is based on a relative location of the data unit element being modified in the cyclic linked list.

Yet another exemplary embodiment of the disclosed subject matter is a method for creating a modified clone based on an existing clone, wherein the method is performed using the data structure, wherein the existing clone is represented by a clone data unit element, wherein the clone data unit element is part of the cyclic linked list, the method comprising: in response to a store instruction targeting a page that is derived from an mmap system call, performing a Copy on Write (CoW) operation with respect to the existing clone, wherein the CoW operation comprising copying content of the page in its entirety regardless of a portion thereof that is affected by the store instruction.

Yet another exemplary embodiment of the disclosed subject matter is an apparatus comprising a processor and a storage device, wherein said apparatus utilizing a file system to represent files retained in the storage device, wherein the file system utilizes a data structure, the data structure comprising a tree data structure and a cyclic linked list of data unit elements, each data unit element in the linked list representing identical clones of a data unit that is used by a file in the file system, wherein each of the data unit elements is associated with a single leaf node in the tree data structure, wherein from each element in the cyclic linked list, the data unit can be reached in time complexity of $O(1)$, wherein said processor is configured to perform Copy-on-Write (CoW) to the data unit, in response to an attempt to modify a clone of the data unit, wherein the CoW comprises: excluding the clone of the data unit from the cyclic linked list and allocating a second data unit to be used by the clone of the data unit and not by the cyclic linked list.

Optionally, the data unit is a page that is derived from an mmap system call, wherein the attempt to modify the clone of the data unit is a store instruction targeting the page, wherein the CoW comprises copying the page to the second data unit in its entirety regardless of a portion of the page that the store instruction is configured to modify.

Optionally, the file system is a multi-tier file system, wherein the CoW is a split-on-write operation, wherein the split-on-write operation comprises selecting one duplicate of the data unit to be the second data unit.

Optionally, the processor is further configured to determine, based on a heuristic, to employ the split-on-write operation instead of a create-on-write operation.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
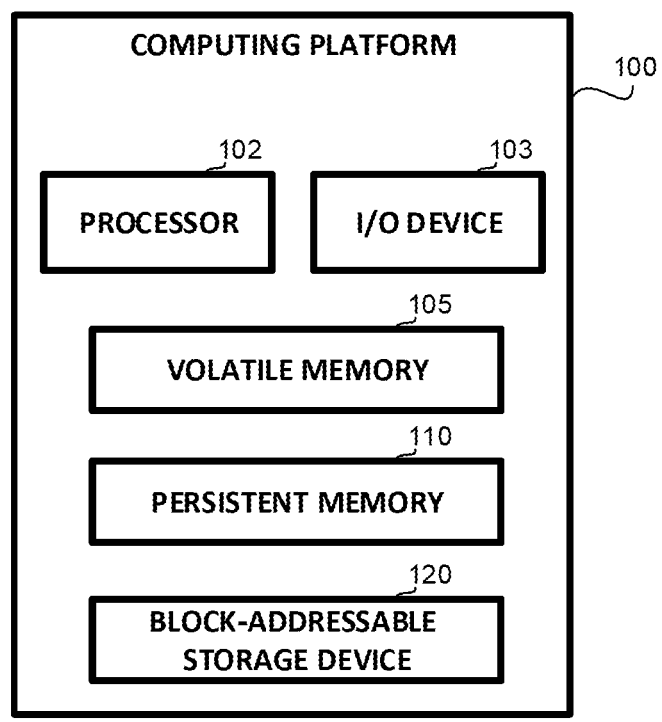
FIG. 1 shows a schematic block diagram of a computing platform, in accordance with some exemplary embodiments of the disclosed subject matter.

One technical problem addressed by the disclosed subject matter is to provide for efficient data cloning in a file system that utilizes persistent memory. In some exemplary embodiments, the data cloning system may provide space efficiency by allowing an original copy and clone thereof, to share common data units. Additionally or alternatively, the data cloning system may provide an efficient copy mechanism where the creation of a clone from an original copy is relatively fast and with little overhead. Additionally or alternatively, the cloning system should support cloning an original copy a plurality of times, and as many times needed. Additionally or alternatively, the cloning system may support the possibility of creating a clone of a clone.

In some exemplary embodiments, a memory-based file system may retain data in pages. The pages can be accessed at lower granularity than blocks, such using addressable memory space (e.g., byte-addressable) and providing random access to the memory page, instead of requiring block-based access, such as to block of 4 KBs.

It will be understood that the term byte-addressable is not to be construed as limited to only address spaces that are capable of being accessing at exactly one Byte granularity, but may also include address spaces using different granularity such as Word granularity, 8B granularity, or the like. In some exemplary embodiments, the granularity may be less than or equal to a size of a processor cache line.

Additionally or alternatively, the byte-addressable memory differs from block-addressable storage, which allows access at a block granularity, which is in orders of magnitude larger than the granularity of the byte-addressable memory (e.g., 4 KBs v. 64B).

Another technical problem is to enable modification of data units that are being changed, such as for a CoW scheme, without replicating unmodified siblings and without inserting metadata into the data units themselves. In view of the present disclosure, a person of ordinary skill in the art would appreciate that introducing metadata into the data units themselves may create undesired inefficiencies, such as complicate the implementation of a modulo function, which can be performed efficiently if the data units do not contain unnecessary metadata.

Yet another technical problem is to minimize storage overhead. The overhead may include allocated storage capacity that is used for metadata associated with the cloning system.

Yet another technical problem is to provide an efficient CoW scheme implementation in a multi-tier file system. In particular, it may be desired to provide for efficient CoW scheme implementation in case the data can sometimes reside on both tiers concurrently.

One technical solution may be to utilize a cyclic linked list of data unit elements. A data unit element may represent a data unit. In some exemplary embodiments, one data unit element, referred to as the "master", may comprise or otherwise be associated with a direct link to the data unit itself. A second pointer is used to point from the master to other data unit elements. Other data unit elements form a linked list using a first pointer. A second pointer from each data unit element points to the master, thereby providing an efficient read access to the data unit itself in a constant time complexity (e.g., time complexity of O(1)). In some cases, the time complexity does not depend on the number of elements in the cyclic linked list. For example, accessing the data unit itself can be performed by up to two pointer dereferences regardless of the number of clones in the cyclic linked list: a first dereference to reach from any data unit element to the master, and a second pointer dereference to reach from the master to the data unit itself. In some exemplary embodiments, the disclosed subject matter may allow for a single dereference from each clone to reach the data unit itself.

In some cases, an object of the file system may be represented using a tree data structure, such as an inode. The tree data structure may comprise tree nodes and leaf nodes. Each leaf node may comprise a plurality of data unit elements used to point, directly or indirectly, to a data unit retaining content of the object, while tree nodes point to nodes (either tree nodes or leaf nodes), thereby providing access to the data units used to retain the content of the object.

It will be noted that although the disclosure refers to a tree data structure, in case of de-duped content within the same object, the tree data structure may actually be a Directed Acyclic Graph (DAG), as the same node may be used twice in the same "tree".

Each tree node may be associated with a reference counter that counts a number of pointer pointing to the sub-tree rooted at the tree node is used. Upon attempting to modify content of a shared sub-tree, a clone of a portion of the shared sub-tree is created for the modified copy, and the modification is implemented only for the copy without affecting the non-modified instances.

The leaf nodes may be associated to data unit elements, such as may point thereto, may comprise the data unit elements, or the like. Each data unit element may be associated with exactly one leaf node (e.g., mapping a data unit element to a leaf node preserves distinctness). In case of a re-used data unit, each clone may be associated with a different data unit element. The different data unit elements may be members of the same cyclic linked list that is associated with the re-used data unit.

In some exemplary embodiments, the data unit element may comprise two pointers, each associated with a different tier in a multi-tier file system. The master may utilize the second tier pointer (t2) to point to a data unit in the second tier. The first tier pointer (t1) may be used, when the data unit is not retained in the first tier, to point to the first non-master data unit element in the cyclic linked list, also referred to as "shadow". As a result, there is no overhead in the allocated memory space used for the data unit element. In some exemplary embodiments, most of data unit elements may only use t2 (e.g., because t1 is typically of substantially lower storage capacity). Hence, there is no overhead at all. In the cases where a t1 page is currently in use, an auxiliary pointer may be used. The auxiliary pointer may require allocation overhead. In some cases, a kernel object, such as a page struct associated with a page pointed to by t1, may be used to point to the shadow. In such a case, an existing page struct object is used and no allocation overhead exists. Non-master data unit elements comprise two pointers as well. In some exemplary embodiments, none of these pointers is used to point directly to the data unit. Instead, one pointer (without loss of generality, t1) may be used to directly point to the master, and the other (e.g., t2) may be used to point to another element, thereby creating a linked list. The linked list of the non-master data unit elements may be cyclic on its own (e.g., a "tail" element may point to the shadow). Additionally or alternatively, the linked list of the non-master data unit elements may be acyclic on its own (e.g., a tail element having a NULL value in t2), and the cyclic feature of the cyclic linked list is achieved via the master as t1 of the tail element points to the master, and the master points (either using t1 or using an auxiliary pointer) to the shadow.

Upon a CoW operation, a data unit element that is to be modified, is removed from the cyclic linked list, and is set as a master with no additional data unit elements. The new master is assigned a fresh data unit to be used to represent the new content. Such an embodiment may be referred to as Create-on-Write, as a new data unit is allocated (or "created").

In some exemplary embodiments, a split-on-write scheme is utilized. Upon a CoW operation, and assuming the data unit that is being modified is retained in two (or more) tiers, such as a copy in a tier one (pointed to by t1) and a copy in tier two (pointed to by t2), no new data unit may be allocated. Instead, the unmodified clones may continue to use one copy of the data unit and the modified clone may use another copy. For example, the value of t1 of the master of the unmodified clones may be copied to t1 of the modified clone. The value of t1 of the master may be deleted. As a result, the tier one copy may be exclusively used by the modified clone and the tier two copy may continue to be used by the one or more additional unmodified clones. It will be noted that the selection of which copy to assign to the modified clone may be based on heuristics, such as taking into account the likelihood that the data would be accessed again and an expected number and types of such accesses.

One technical effect of utilizing the disclosed subject matter is an efficient file system with reduced overhead compared to what is known in the art, both in terms of space overhead used for metadata of the filesystem and of speed.

The space inefficiency may be capped at 50% of the pointers used to point to data units. Such inefficiency may be exhibited by introducing a second pointer in the data unit element solely for the purposes of the disclosed subject matter. In a multi-tier file system, the space inefficiency may be reduced significantly. Assuming, for example, that capacity of tier one is 5% of the total storage capacity of the file system, then in about 95% of the cases, t1 is not used and there's no inefficiency. Only where t1 is being used, inefficiency may exist, reaching inefficiency of about 5%. However, such limited inefficiency may also be eliminated by reusing existing data structures, such as the kernel's page struct associated with the page to which t1 may be pointing.

Referring now to FIG. 1, showing a schematic block diagram of a computing platform, in accordance with some exemplary embodiments of the disclosed subject matter.

Computing Platform 100 comprises Processor 102 which may be a Central Processing Unit (CPU), a microprocessor, an electronic circuit, an Integrated Circuit (IC) or the like. Processor 102 may be utilized to perform computations required by Computing Platform 100 or any of it subcomponents.

In some exemplary embodiments of the disclosed subject matter, Computing Platform 100 may comprise an Input/Output (I/O) Device 103. I/O Device 103 may be utilized to provide output to and receive input from a user. I/O Device 103 may be a peripheral device connected to computing platform 100, such as a keyboard, a speaker, a microphone, a display, or the like. In some exemplary embodiments, I/O Device 103 may be accessed via a bus, may be accessed as a peripheral device of Computing Platform 100, may be accessed over a network connection, or the like.

Computing Platform 100 may comprise Volatile Memory 105, such as Random Access Memory, cache memory, combination thereof, or the like, which may be used during execution of one or more programs. Volatile Memory 105 may be byte-addressable. In some exemplary embodiments, Volatile Memory 105 may be accessed via a bus, may be accessed as a peripheral device of Computing Platform 100, may be accessed over a network connection, or the like.

Additionally or alternatively, computing platform 100 may be associated with persistent storage which may or may not be comprised directly by Computing Platform 100. In some exemplary embodiments, the persistent storage may be accessed via a bus, may be accessed as a peripheral device of Computing Platform 100, may be accessed over a network connection, or the like. The persistent storage may be a non-volatile computer-useable medium used for long-term data storage such as a hard disk drive (HDD), a solid-state disk drive (SSD), a PCIe-attached Flash drive (NVMe SSD), or the like. Persistent storage may be implemented using a Persistent Memory 110 and optionally also using a Block-Addressable Storage Device 120. Persistent Memory 110 may be byte-addressable memory, such as, for example, non-volatile DIMM (NVDIMM) card or brick over a network, such as silicon photonics, PCI express (PCIe), Infiniband, or the like. In some exemplary embodiments, Persistent Memory 110 may reside on the memory interconnect and respond in near-memory speed, which may be orders of magnitude faster than Flash-based drives. Persistent Memory 110 may be used for long-term storage, such as by retaining a file system comprising one or more files. In some exemplary embodiments, Persistent Memory 110 may be configured to provide direct random access to Processor 102 using machine-level instructions, such as loads and stores, directed at the addressable space.

In some exemplary embodiments, Persistent Memory 110 may be used to retain the data structures used by the file system, such as the tree data structures representing the objects of the file system. Nodes of the tree data structures may be retained on Persistent Memory 110. In some exemplary embodiments, because the tree data structures are retained in Persistent Memory 110, they may be accessed quickly and efficiently.

In some exemplary embodiments, data units used to retain content of file system objects, such as files, directories, or the like, may be retained in Persistent Memory 110, Block-Addressable Storage Device 120, or in both. In some exemplary embodiments, the file system may be a multi-tier file system using a plurality of tiers to retain information. In some exemplary embodiments, the multi-tier file system may use Persistent Memory 110 as a first tier and Block-Addressable Storage Device 120 as a second tier. Additionally or alternatively, both the first tier and the second tier may be implemented using different persistent memory devices, such as devices differing in their costs and performances. In some exemplary embodiments, the first tier may be more expensive per given capacity but faster than the second tier. In some exemplary embodiments, accessing the first tier may be performed directly, while bypassing software caches, such as Linux™ page cache. In some exemplary embodiments, valid data unit content could be in memory tier (e.g. t1), in block-based tier (e.g., t2), or in both concurrently.

Figure 2A:
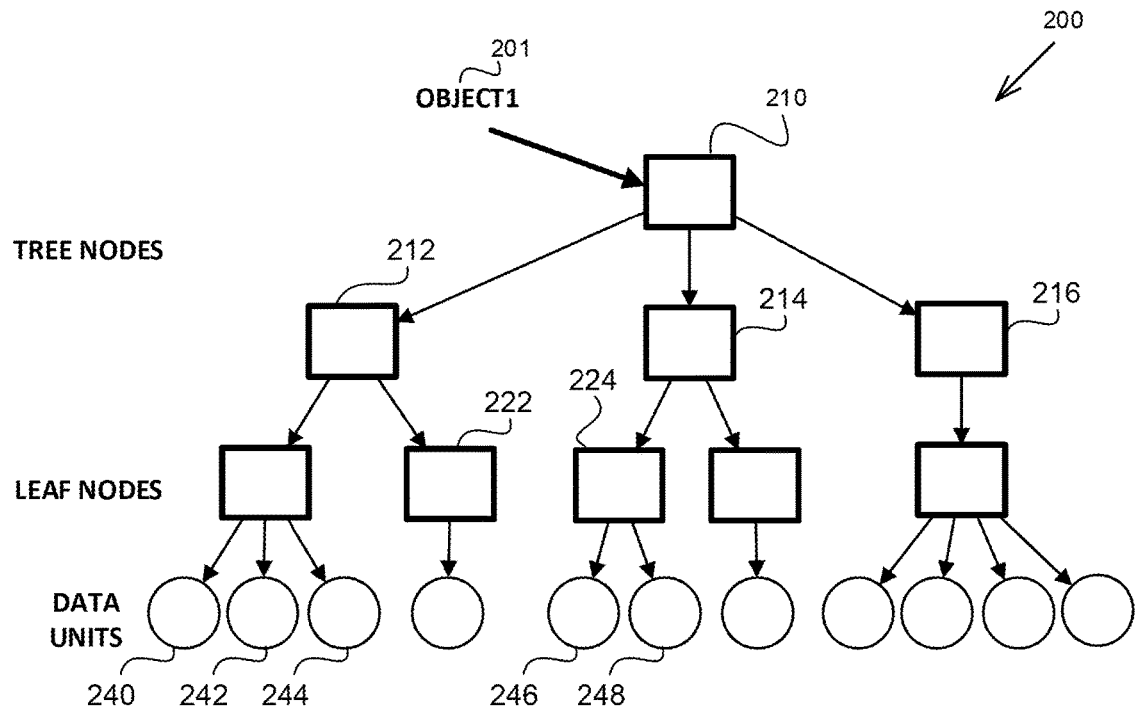
FIGS. 2A-2D show schematic illustration of a data structure used to represent an object, in accordance with some exemplary embodiment of the disclosed subject matter.
Figure 2B:
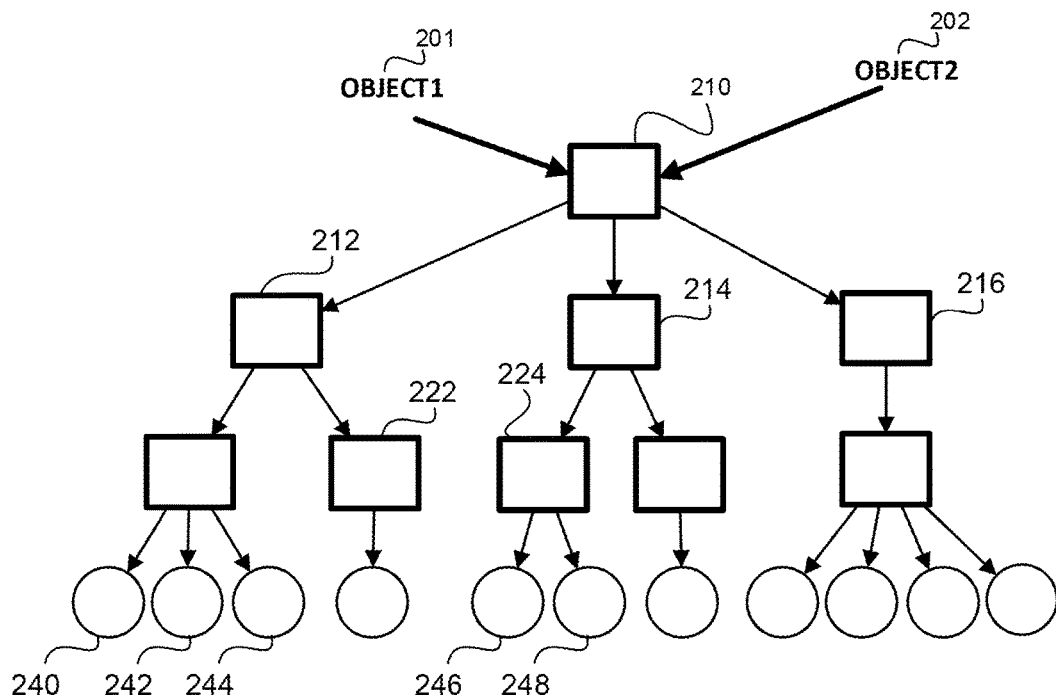

Referring now to FIG. 2A, showing a schematic illustration of a data structure used to represent an object, in accordance with some exemplary embodiment of the disclosed subject matter.

Object 1 201 is represented using a Tree Data Structure 200, such as inode used in Linux™. Tree Data Structure 200 comprises nodes. Tree nodes, such as 210, 212, 214, 216 are nodes pointing to other nodes in Tree Data Structure 200. Leaf nodes, such as 222, 224 are nodes at the lowest level of Tree Data Structure 200 and they point to data units which retain the data representing the content of Object 1 201. Data units, such as 240, 242, 244, 246, 248, may be pages retained in persistent memory (e.g., 110 of FIG. 1). Additionally or alternatively, the data units may be blocks in a block-based storage device (e.g., 120 of FIG. 1). In some exemplary embodiments, data units may be retained in different tiers.

In some exemplary embodiments, Tree Data Structure 200 may be retained in a memory, such as persistent memory 110 of FIG. 1, enabling efficient and fast access thereto.

Assuming a light-weight clone of Object 1 201 is to be created without any modifications, Object 2 202 may utilize the same Tree Data Structure 200 of Object 1 201. Object 2 202 points to Root Node 210 of Tree Data Structure 200. A reference counter (RC) in or associated with Root Node 210 may be updated to indicate a number of objects in which the root node and the tree defined thereby are used. In case an object (e.g., Object 1 201 or Object 2 202) is deleted, the reference counter is decreased by one. When the reference counter reaches zero, the Root Node 210 may be deleted and freed. Reference counters of the pointed nodes to which Root Node 210 points are accordingly reduced and potentially deleted if the counter reaches zero, and so forth and so on per deleted node.

Figure 2C:
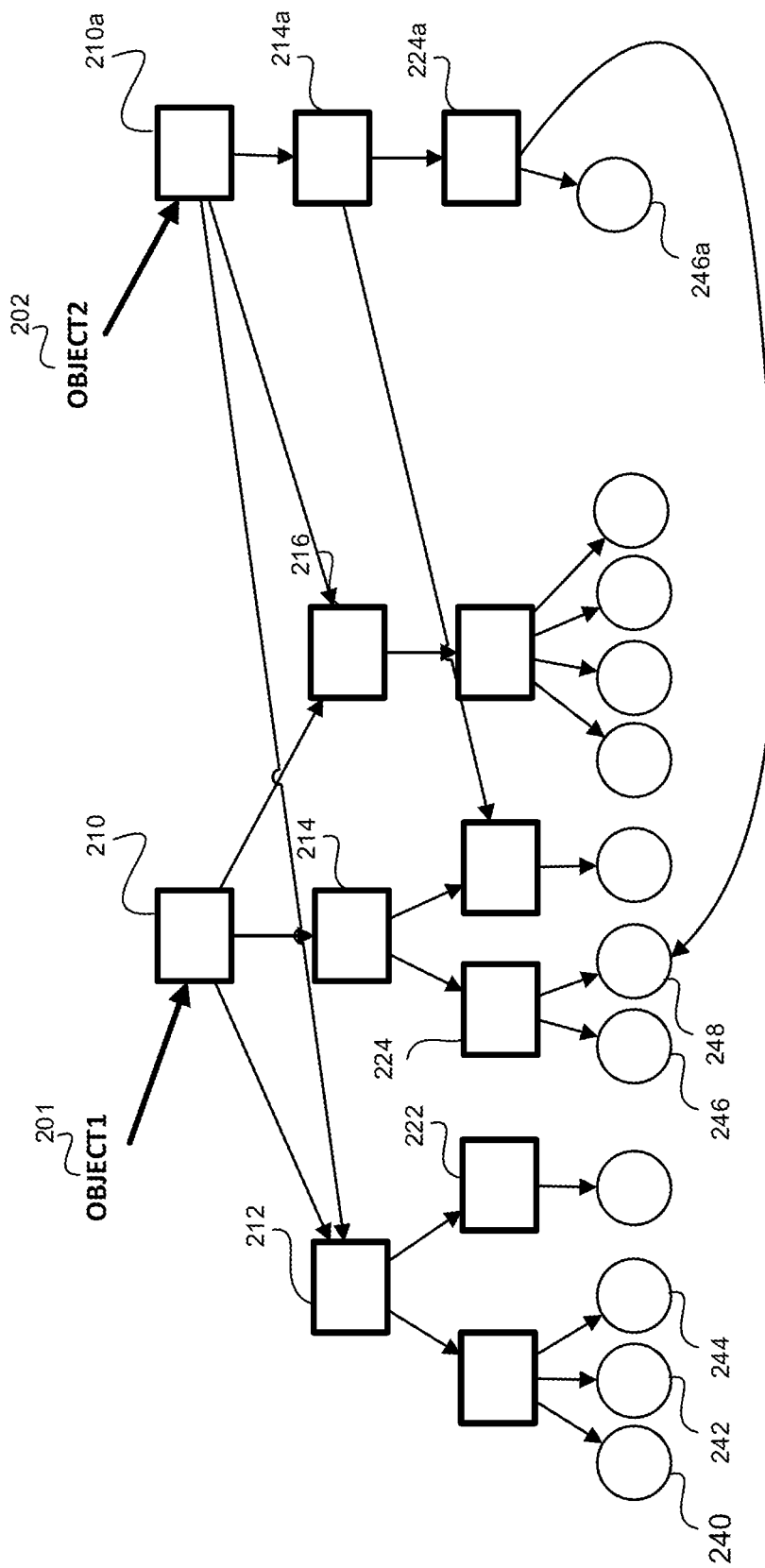

In response to a modification of Object 2 202, Copy on Write is implemented. In the illustrated example, the write request (e.g., through a write command (e.g., system call) to the file system, or via a store machine-level instruction to a memory mapped page (e.g., via the mmap system call) is assumed to affect data unit 246. The file system may traverse the tree data structure representing Object 2 202, starting from Root Node 210 to the intermediate nodes and leaf. During the traversal, all reference counters are checked to validate that they all hold the value of one (i.e. unique owner). On the first reference counter that has a value larger than one, a decouple action is initiated. The file system separates the modified subset object (Object 2 202) from subsets of other instances (in this example, Object 1 201). FIG. 2C shows an outcome of such decouple operation. As Root Node 210 had a reference counter of 2, it is the first that needs to be duplicated. Object 2 202 now refers to a new Root Node 210a. The path reaching the affected data units (210, 214, 224) is replaced by a replica path (210a, 214a, 224a). The Root Node 210a may also point to nodes used by Object 1 201, which are unaffected by the modification (Nodes 212, 216). The reference counters of such unaffected nodes are increased accordingly. Modified content of data unit 246 is retained within alternative data unit 246a, which is pointed to be the new Leaf Node 224a. Leaf Node 224a, however, re-uses data unit 248, in accordance with the disclosed subject matter.

As can be appreciated, internal nodes of Tree Data Structure 200, as well as data units, are re-used to represent Object 2 202, thereby reducing the overhead of having duplicate objects with little difference therebetween. Content of sibling data units pointed to be the same leaf node as a data unit that is being modified may be reused without allocating new data units. The number of additional metadata and data added to also provide a tree data structure representing Object 2 202 is relatively small compared to those used in the tree data structure 200 representing Object 1 201, as most of the metadata and data is not copied. Avoiding copying the data also saves time and space. It is noted that data unit 248 may not comprise a reference counter, and as a result, a different mechanism to allow for handling of re-use may be utilized with respect to the data units than with the nodes, such as Node 216.

Figure 2D:
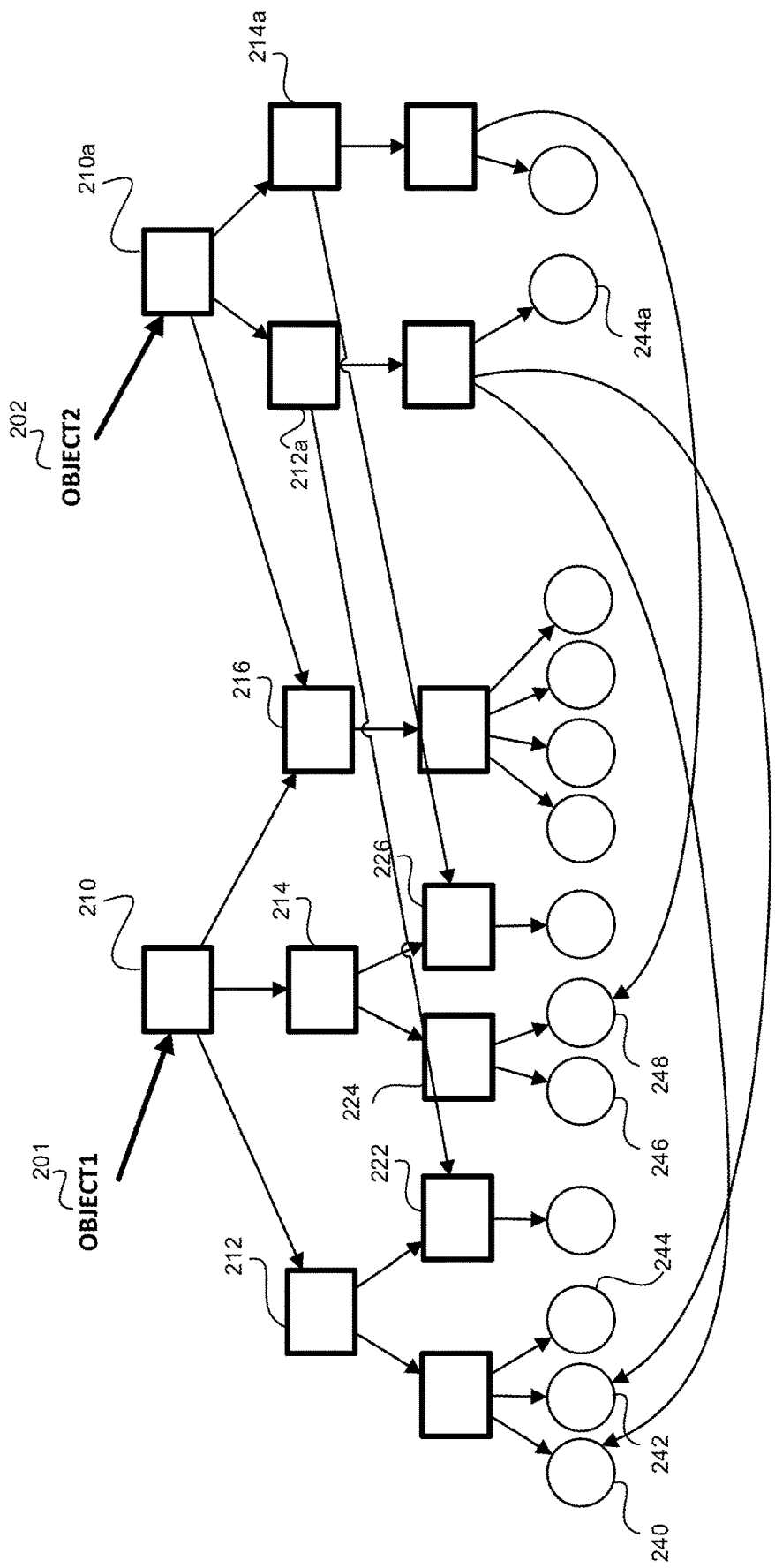

If another modification request is requested to Object 2 202, for example in an offset translated to Data Unit 244, then Node 210a acting as a root node for Object 2 202 may be modified, as is exhibited in FIG. 2D. After the modification, the metadata in the tree representing Object 2 202 comprises all the paths from the modified data to the root node (e.g., including path from root node 210a to 244a). The rest (e.g. the intermediate node 216, 222 and 226) is still shared, as well as sibling data units which are unmodified (data units 240, 242).

Figure 2E:
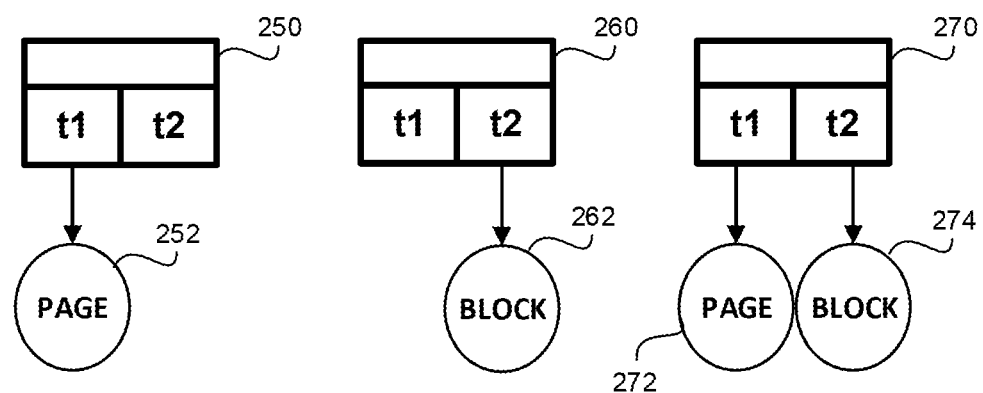
FIG. 2E shows a schematic illustration of a data unit element in a multi-tier file system, in accordance with some exemplary embodiment of the disclosed subject matter.

Referring now to FIG. 2E, showing a schematic illustration of a data unit element in a multi-tier file system, in accordance with some exemplary embodiment of the disclosed subject matter.

A data unit element, such as 250, points to a data unit retaining content in persistent storage. In a multi-tier file system having two tiers, Data Unit Element 250 comprises two pointers to data units, one for tier one (t1) and the other for tier two (t2). Assuming t1 is persistent memory and t2 is block-based storage, t1 in Data Unit Element 250 points to a page (252), while t2 in Data Unit Element 250 points to a block (262). Each data unit has two logical pointers in the data unit element. The first is to the location in tier 1 (may be empty) the second is to a location in tier 2 (may be empty). In some cases, one tier or both may be used to retain the data. Both t1 and t2 may be used depending on the point in time and pressure on t1, data unit access patterns, prefetch heuristics, user hints, or the like. Data Unit Element 250 exemplifies retaining data only in a page data unit (252). Data Unit Element 260 exemplifies retaining data only in a block data unit (262). Data Unit Element 270 exemplifies retaining the data in two duplicate copies: page data unit (272) and block data unit (274). Fixed contents, such as zeroes, may be further encoded as a flag within the data unit element, while both pointers are marked as invalid.

In some exemplary embodiments, a leaf node, such as 222 of FIG. 2A may comprise a plurality of data unit elements, each of which used to provide access to a different data unit. Assuming an 8B pointer, a data unit element may require 16B. A leaf node having a size of 4 KB may consist of 256 data unit elements, each of which useful for representing a different data offset. In such an embodiment, a data unit element has 255 siblings, and as a result, avoiding duplication of the unmodified 255 siblings when a single data unit is modified, may improve the capacity efficiency of the file system in a drastic manner. In some exemplary embodiments, the number of data unit elements within a leaf node is determined so as to align the leaf node to a size of a page (e.g., 4 KB in the example above).

Figure 3A:
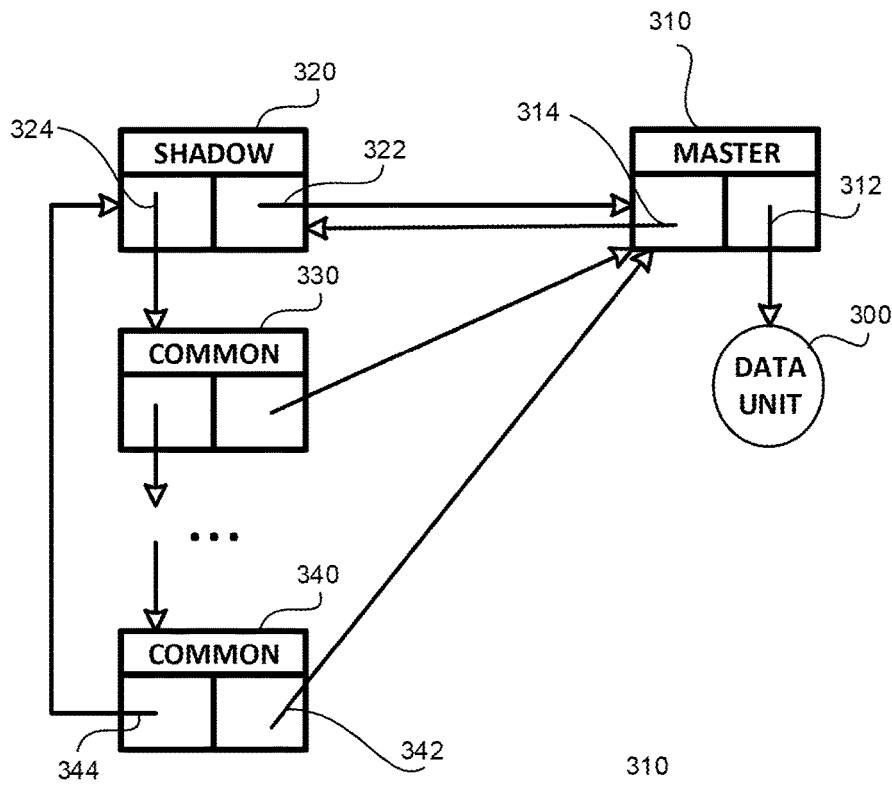
FIGS. 3A-3D show schematic illustrations of data structures for representing clones of data units, in accordance with some exemplary embodiments of the disclosed subject matter.

Referring now to FIG. 3A, showing a schematic illustration of a data structure for representing clones of data units, in accordance with some exemplary embodiments of the disclosed subject matter.

The data structure depicted in FIG. 3A is a cyclic linked list of data unit elements. Each data unit element has two pointers: one used for traversal of the cyclic linked list and one used for quick access to Data Unit 300.

A Master 310 is a data unit element having a direct link to Data Unit 300 retaining content. The cyclic linked list comprises a single Master 310. Master 310 comprises two pointers: Pointer 312 and Pointer 314. Pointer 312 is used to directly link to Data Unit 300. Pointer 314 is used to link Master 310 to other data unit elements.

The data unit element to which Master 310 points is termed "Shadow" (320). All other data unit elements, such as 330, 340, are referred to as "Common".

Shadow 320 comprises two pointers (322, 324). Pointer 322 is used to point to Master 310, thereby providing a quick access route to Data Unit 300 that is independent on the number of data unit elements. Pointer 324 is used to point to a next other data unit element in the cyclic linked list.

Common data unit element, such as 340, comprises two pointers (e.g., 342, 344): one directly pointing to Master 310 thereby enabling quick access to Data Unit 300; and one for pointing to a next other data unit element in the cyclic linked list.

When the file system handles a first CoW in a shared leaf node, it may allocate the leaf and the data unit to be modified, but it may also add all the non-zero siblings to their circular linked lists. Each such sibling points to the respective master with one pointer and adds itself to the list with another pointer. The master or another data unit element is also updated in order to link to the sibling. The master is updated in case the sibling is the first clone, and is therefore the shadow. If a shadow already exists, another data unit element, such as the shadow or another common, is updated.

In some cases, the disclosed data structure may provide the effect of having a low access latency due to the direct pointer to the master (and regardless of the number of members in the cyclic linked list). Another effect may be providing the ability to efficiently delete obsolete metadata by maintaining the cyclic linked list.

In FIG. 3A, the linked list formed by Shadow 320 and all commons (e.g., 330, 340 and any common in between) is a cyclic list in its own, as Pointer 344 points to Shadow 320. In case there is only a shadow and no common. Pointer 324 may point to Shadow 320 itself.

Figure 3B:
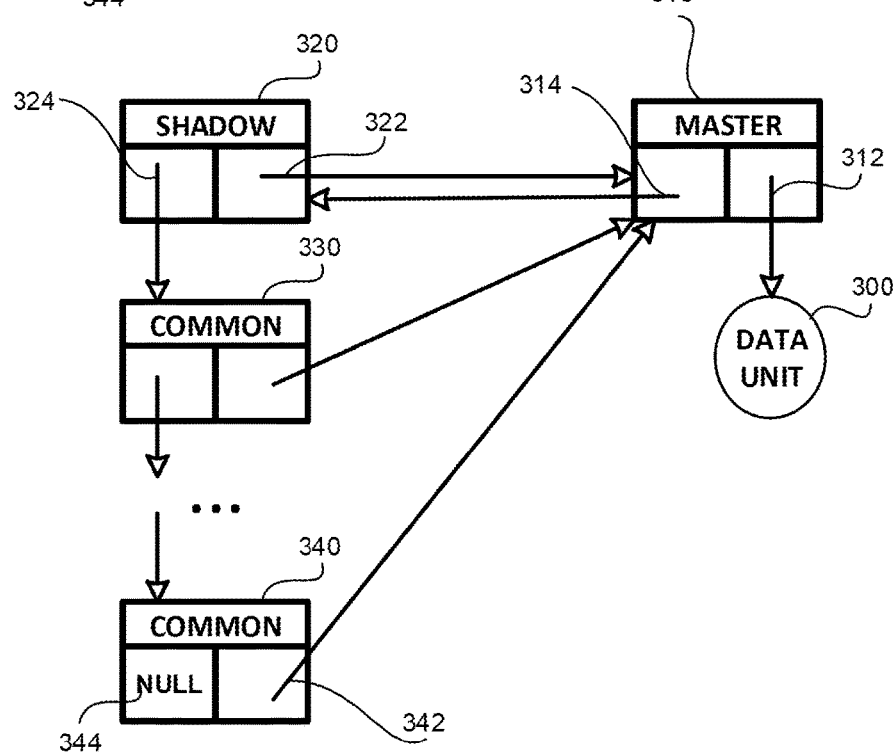

Referring now to FIG. 3B, showing an alternative embodiment, where the linked list formed by all non-master elements is not a cyclic linked list on its own. Pointer 344 of the last common (e.g., tail element), Common 340m, comprises a NULL value, representing the end of the list. The cyclic feature of the cyclic linked list is achieved via Master. The Shadow and commons link to each other via the first pointer. The second pointer of the last common (342) points to Master 310, which points, in turn, to Shadow 324.

Figure 3C:
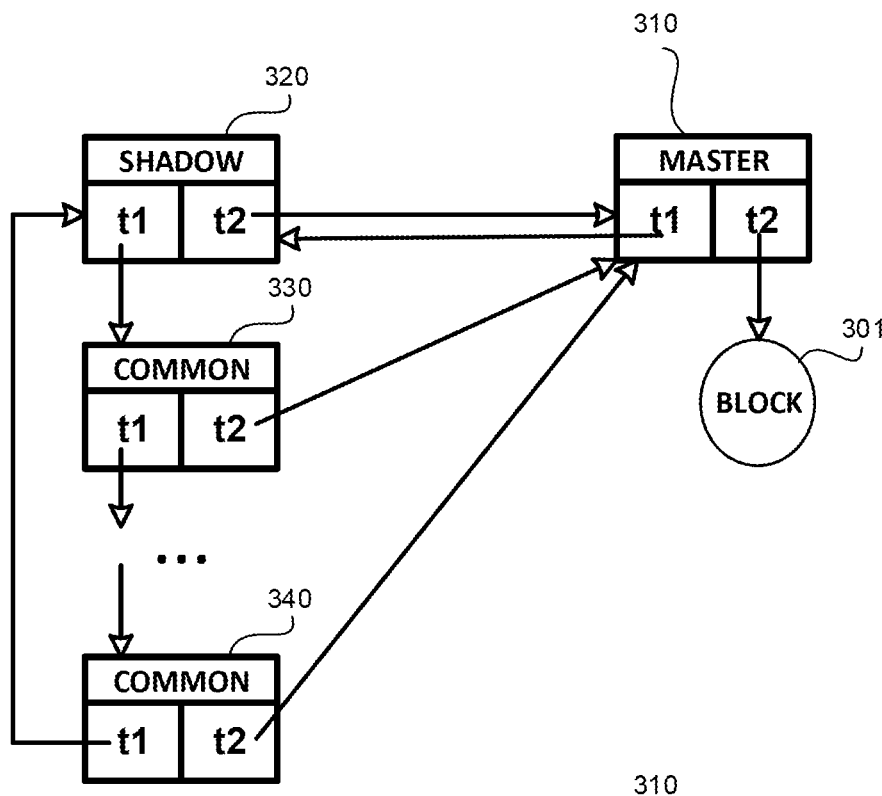

Referring now to FIG. 3C, showing an illustration of a data structure in accordance with the disclosed subject matter in a multi-tier file system. The multi-tier file system comprises two tiers: first tier and a second tier. In the present example, tier one is a persistent memory, while tier two is a block-addressable storage device. It will be noted, though, that in some cases, both tiers may be implemented using a same type of storage, such as both implemented using persistent memory, having different qualities or performances.

Each data unit element, such as 310, 320, 330, 340, comprises two pointers: a first tier pointer (t1) and a second tier pointer (t2). Master 310 comprises a link to the data unit. FIG. 3C shows a typical case where the data unit is retained in tier two, which is generally expected to have substantially larger capacity than tier one. Because in this example tier two is a block-addressable storage device, the data unit pointed to by t2 of Master 310 is Block 301. In this typical case, t1 is not being used to point to a data unit. Instead, the disclosed subject matter, utilizes t1 to point from Master 310 to Shadow 320.

Each non-master data unit element (e.g., Shadow 320, or Common 330, 340) comprises the two pointers as well. However, they are both used to establish the data structure in accordance with the disclosed subject matter. One pointer is used to point to Master 310 directly, thereby providing quick access to Block 301 (or other data unit pointed to by Master 310). The other pointer is used to establish the linked list of non-master elements. In the example of FIG. 3C, t1 is used to link to other non-master element (e.g., a next element in the cyclic linked list) and t2 is used to directly point to Master 310. However, other embodiments may utilize t2 for the first role and t1 for the second role.

In some exemplary embodiments, in case Master 310 utilizes t1 to point a data unit (e.g., Page 302 of FIG. 3D) and t2 is not being used, t2 may be used to point at Shadow 320. Additionally or alternatively, when t1 is being used, the same implementation as when both t1 and t2 are being used may be used.

Figure 3D:
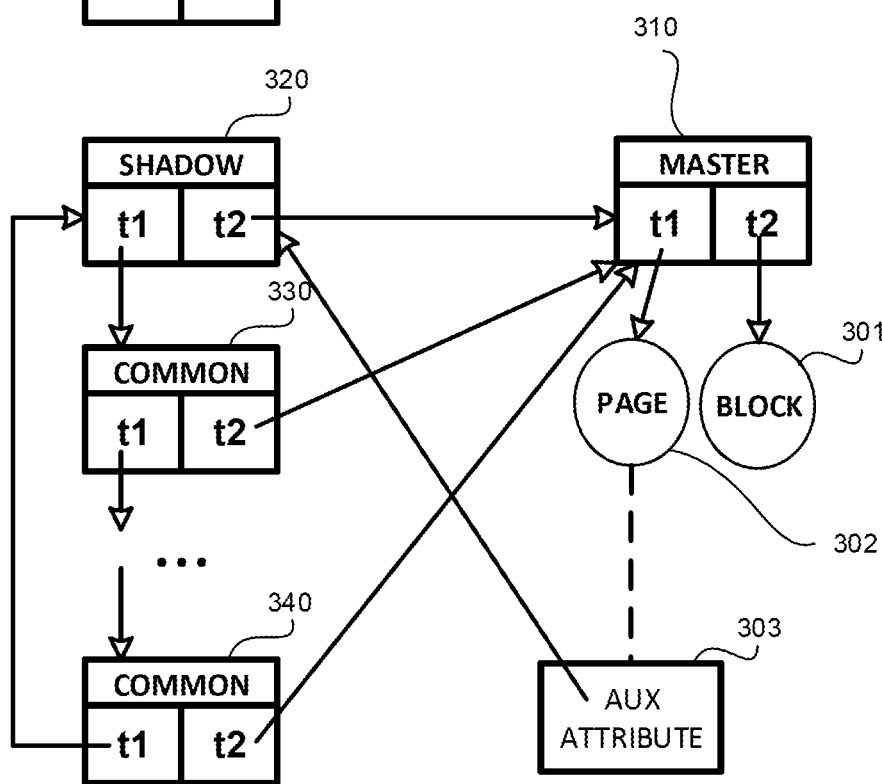

FIG. 3D shows a case where the data unit is retained in both tiers of the multi-tier file system. t1 of Master 310 points to Page 302, while t2 points to Block 301, both retaining identical information. FIG. 3D shows using an Auxiliary Attribute (AA) 303 that is associated with Master 310, either directly or indirectly. AA 303 is used to point to Shadow 320. AA 303 may be auxiliary attribute that is allocated specifically for the purposes of the disclosed subject matter. Additionally or alternatively, AA 303 may be part of a pre-existing structure already allocated and which can be associated with Master 310. In some exemplary embodiments, AA 303 may be comprised by a page struct. In some operating systems, such as in Linux™, each page has an associated data structure referred to as a page struct. The page struct is used to retain information regarding the page. For example, the page struct may be defined as follows:

```
struct page {
    page_flags_t   flags;
    atomic_t       _count;
    atomic_t       _mapcount;
    unsigned long  private;
    struct address_space  *mapping;
    pgoff_t        index;
    struct list_headlru;
    void           *virtual;
};
```

AA 303 may be retained in the page struct, such as within the private unsigned long field. In some exemplary embodiments, the page struct is only accessible to the kernel, and thus requires kernel permissions when the page struct is accessed.

In some exemplary embodiments, the role of data unit element may be indicated, such as using a flag. In some exemplary embodiments, the flag may indicate whether the data unit element is a master or not. Additionally or alternatively, the flag may indicate whether a non-master is a shadow or a common. The flag may be embedded in the leaf node retaining the data unit element. Additionally or alternatively, the flag may be otherwise associated with the data unit element. The flag may be kept in volatile memory, and upon mount of the file system, the roles may be deduced, such as by inspecting the pointed objects pointed to by the data unit element. If the pointed element is a block or a page, then the data unit element can be flagged as the master. The data unit element that is pointed to by the master can be flagged as the shadow.

In some exemplary embodiments, the data structure may retain a reference counter indicating how many data unit elements there are in the data structure. Additionally or alternatively, instead of a reference counter, an indicator may be used to indicate whether there is one data unit element (e.g., only a master), two data unit elements (e.g., a master and a shadow), or more than two data unit elements (e.g., a master, a shadow, and one or more commons). The indicator may be retained or computed automatically based on the values of pointers. For example, if the pointer from the master to the shadow has null value, then there is only the master. If there is a pointer to an actual shadow, then if the pointer to the next element is null or alternatively, points to the shadow itself, then there are exactly two data unit elements. Otherwise, it can be deduced that there are more than two elements.

In an alternative embodiment, each non-master data unit element utilizes a pointer (e.g., t1) to directly point to the data unit (e.g., Block 301 or Page 302) instead of pointing to Master 310. Such a data structure reduces the number of pointer dereferences required to access the data unit from a non-master data unit element to one. However, upon tiering down the data unit, the entire list of non-master data unit elements needs to be traversed and updated, and not just Master 310. The complexity of such change tier operation is O(N), where N is the size of the cyclic linked list. In some exemplary embodiments, t1 is used to point to the data unit itself only in case the data unit is retained in tier one (e.g., Page 302 and not Block 301), providing the improved performance when the accessed data unit is in tier one, where data access may be more efficient and fast. The O(N)

complexity is incurred only for tierdown, which may be a relatively long process that is performed in the background in any case.

Figure 4A:
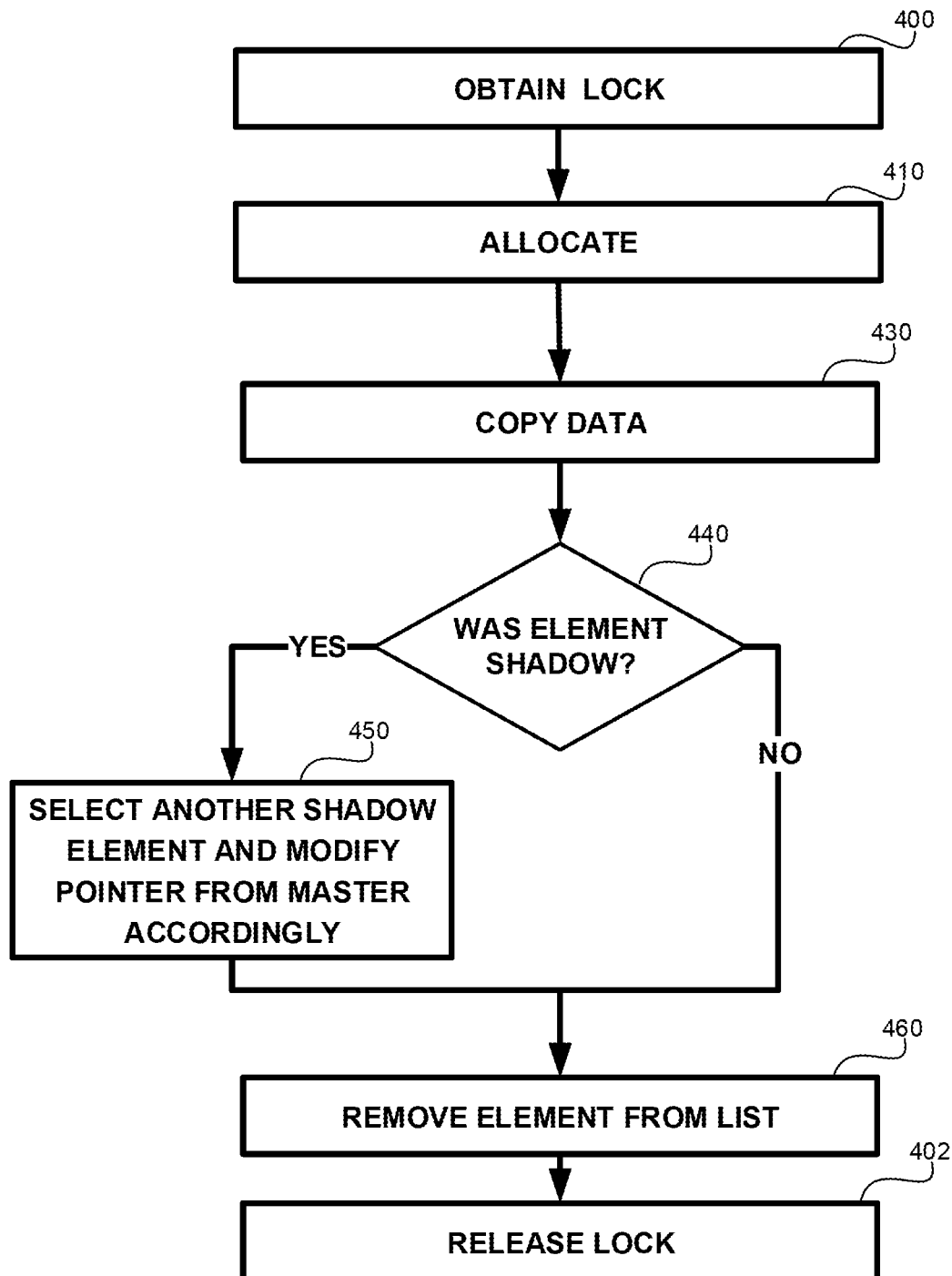
FIGS. 4A-4B show flowcharts of methods for handling a modification of a cloned copy of a data unit, in accordance with some exemplary embodiments of the disclosed subject matter.
Figure 4B:
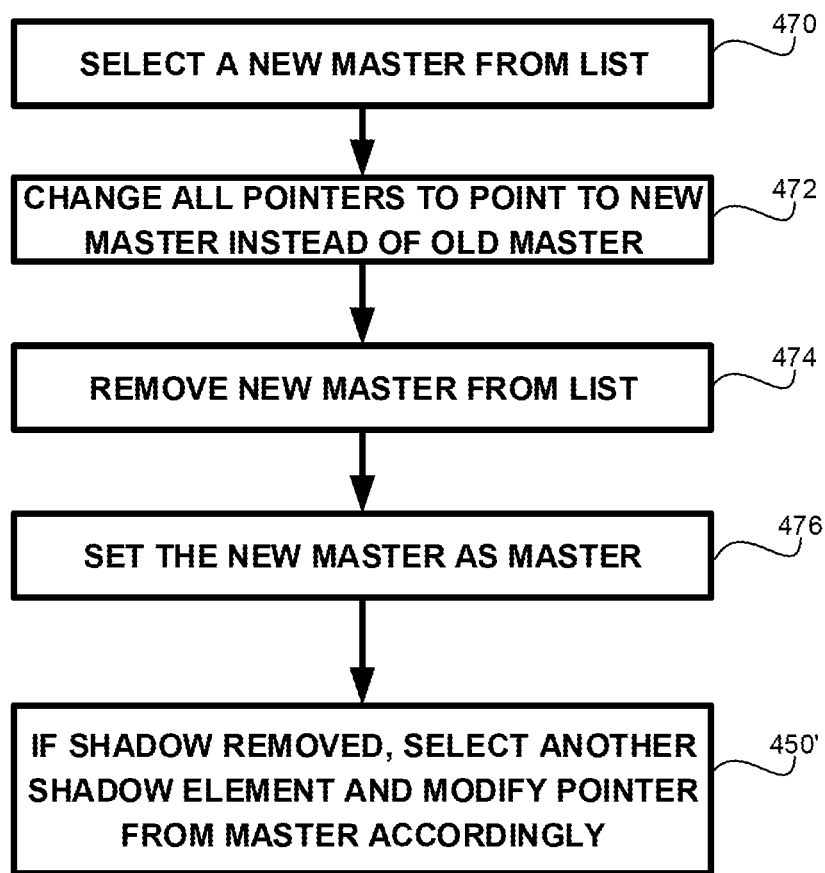

Referring now to FIG. 4A, showing a flowchart of a method, in accordance with some exemplary embodiments of the disclosed subject matter. The method of FIG. 4A shows a CoW operation, when a clone is being modified. FIG. 4A assumes the clone being modified is not the master (e.g., it is a shadow or a common). FIG. 4B addresses additional steps in case the removed element is the master.

On Step 400, a lock associated with the master is obtained. The lock is obtained to avoid races between other processes or threads. Modifying the list of clones (e.g., creating a new clone and adding it to the data structure, removing the clone as part of a CoW operation, or the like) may require taking the lock beforehand.

On Step 410, a data unit to be used for the clone is allocated. In some exemplary embodiments, the data unit element is modified to become the Master of a new data structure having a single clone.

On Step 430, data may be copied to the newly allocated data unit. The data may be written to the data unit, such as by performing a write instruction. In some exemplary embodiments, it may be determined if the cloned data unit is completely rewritten or only partially rewritten prior to writing the data. If only partial write is to be performed, then some of the original data would persist after the write operation. Data from the data unit pointed to by the master may be copied to the newly allocated data unit beforehand. Additionally or alternatively, if the write operation is a result of a store machine-level instruction (st) causing a page fault to an mapped page, then the entire data is copied regardless.

On Step 430, the write operation is performed on the newly allocated data unit.

The data unit element may be removed from the list used to represent all clones of the original data unit. If, however, the data unit element had a special function, another data unit element may need to take its place. If the data unit element had served as a shadow (440), Step 450 is performed.

On Step 450, another element is selected to be the shadow, and the pointer from the master may be set to point to the newly selected shadow. If the removed element was the only clone (e.g., it was the shadow, and there exists no common), then the pointer from the master may be set to have a null value.

On Step 460, the element is removed from the list. If the list of non-master elements is a cyclic list on its own (e.g. FIG. 3A), the element preceding the element to be removed is located and its next element pointer is modified to point to the element pointed to be the next element pointer of the removed element. In case the list of non-master elements is non-cyclic on its own (e.g., FIG. 3B), the same modification may be performed expect if the removed element is the shadow. In such a case, the operation in Step 450 may be sufficient.

On Step 402, the lock taken at Step 400 may be released.

Referring now to FIG. 4B addressing the scenario where the element to be removed is a master element.

On Step 470, a new master is selected from the list. The new master may either be a former shadow or a former common.

On Step 472, the list of non-master elements is traversed and the pointers pointing to the master are modified to point to the new master. In some exemplary embodiments, in case the non-master elements point to the data unit itself, such as, for example, using t1 to point to a tier one page, Step 472 may be avoided. In such a case, the new master may simply be updated to use a different data unit, and the non-master elements may not need to be updated as they point to the previously pointed to data unit, which continues to be used for the same purpose of representing the unmodified content.

On Step 474, the element which was selected to be the new master is removed from the list of data unit elements. Step 474 may be similar to Step 460.

On Step 476, the new selected master is set as the master. The new master may be flagged as the master. Additionally or alternatively, the new master may be modified to point to the data unit(s) to which the now-old master has pointed to originally, and which retain the unmodified content. Additionally or alternatively, a pointer of the master (e.g., t1 or AA), may be set to point to the shadow.

Step 450', similar to Step 450 of FIG. 4A, may be performed in case the new master was previously set as the shadow. In such a case, another shadow is selected and the pointer from the master is set accordingly. In some cases, the pointer from the new master is never set to point to the old shadow (i.e., itself), but instead is directly set to point to the new shadow.

In some exemplary embodiments, in case a de-duplication operation is performed and an element is identified as having the same content as that held by a master element, the data unit utilized by the element may be freed. The element may be modified to point to the master (e.g., in t2), and to point to a next element in the list (e.g., in t1). In some cases, the element may be introduced in the list as either the shadow (if no shadow pre-exists) or as a next element succeeding the shadow. The next element pointer (e.g., t1) of the element may be set to be the address pointed to by the next element pointer of the shadow (e.g., a next item after the shadow before adding the element to the list). A next element pointer of shadow may be modified to point to the element. In view of the present disclosure, a person of ordinary skill in the art would recognize, that additional manners of adding the element to the list may exist.

Figure 5A:
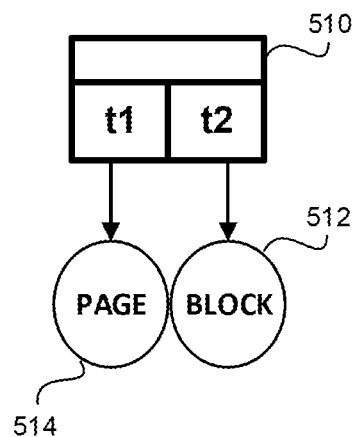
FIGS. 5A-5C show schematic illustrations of create-on-write process and of split-on-write process, in accordance with some exemplary embodiments of the disclosed subject matter.
Figure 5B:
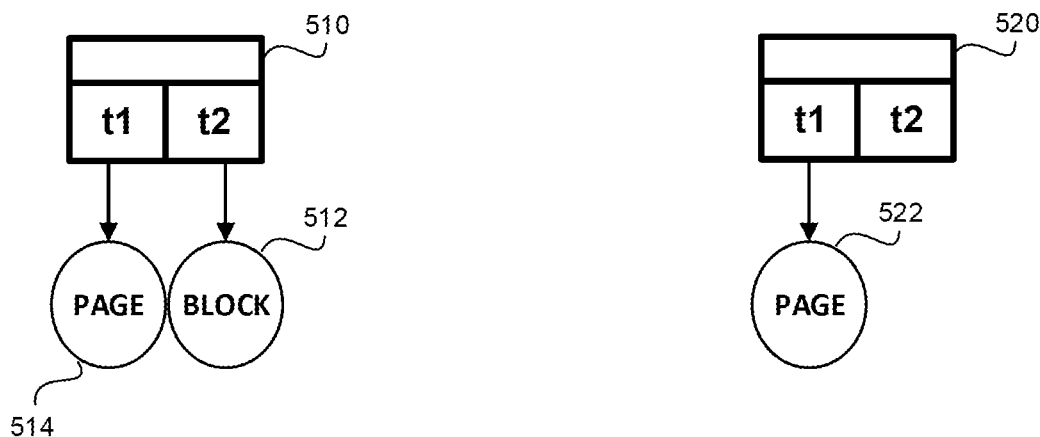
Figure 5C:

FIGS. 5A-5C show schematic illustrations of create-on-write process and of split-on-write process, in accordance with some exemplary embodiments of the disclosed subject matter.

Data Unit Element 510 (e.g., a master) retains the content in two tiers. Page 514 and Block 512 both include identical content.

Upon a Copy-on-Write (CoW) operation of a clone of Data Unit Element 510 (e.g., either of 510 itself or of other data unit elements linked thereto), a create-on-write process may be implemented, and a new data unit may be allocated and used for the modified data unit. For example, Data Unit Element 520 may be the modified clone, and a Page 522 may be allocated to be used by Data Unit Element 520. The content of Page 514 (or of Block 512) may be copied to the newly allocated Page 522, and the modification thereof may be implemented, so as to only affect Data Unit Element 520 and not Data Unit Element 510 and other clones thereof.

Additionally or alternatively, a split-on-write operation may be performed. Instead of allocating a new data unit, one of the duplicative data units used by Data Unit Element 510 may be released therefrom and used by Data Unit Element 520. In such a case, no new data unit is allocated, and the content of the data unit prior to its modification is provided without requiring additional copy operation. After the Split-on-Write operation is completed, Data Unit Element 510 uses a single data unit to retain the original content (e.g., Block 512) and Data Unit Element 520 uses a single data unit to retain the modified content (e.g., Page 514).

In some exemplary embodiments, the split-on-write may save a data unit and reduces performance overhead associated with copying content. The split-on-write, however, may intervene with the tiering mechanism, and there may be a degraded performance when accessing other clones, as the tier one data unit is no longer available for such clones. In some exemplary embodiments, the performance may be degraded only with respect to access attempts that are performed shortly after the split-on-write operation. The engineering tradeoff may be resolved using one or more heuristics. One heuristic may prefer the split-on-write approach when there are no free tier one pages available, or if there are a few left (e.g., below a minimal threshold, such as an absolute number (about 100, about 200, or the like), a relative number (about 2%, about 5%, about 10%, or the like). Another heuristic may be based on a relative location and role of the data unit element that is being modified in the cyclic linked list. As an example, the split-on-write operation may be preferred when the element being changed is the tail element to join the linked list (e.g., the last common data unit element, either having a next pointer having a null value or pointing to the shadow element). Such a heuristic may be adapted to utilize the split-on-write in a scenario where sequence of snapshots for the same file are created. In such a scenario, typically, the latest version is the only one being accessed or at least the one that is mostly accessed. Another heuristic may check the timestamp of the last access time to the data unit to make the determination. Yet another heuristic may evaluate a last access time, such as based on a tiering queue of which it is a member. The closer the data unit is to being tiered down, it may be considered as a better candidate for split-on-write instead of create-on-write.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
using a first pointer by a master data unit element of a cyclic linked list having a plurality of data unit elements to point to a data unit stored in a persistent memory of a computing device, the data unit retaining content of an object accessible to a persistent memory-based file system;
using a second pointer by the master data unit element to point to a data unit clone stored in a storage device;
associating an auxiliary attribute with the master data unit element and a first data unit element of the cyclic linked list, the first data unit element pointing to the master data unit element and to a second data unit element, the second data unit element pointing to the master data unit element and the first data unit element;
replacing the master data unit element by the first data unit element by modifying the first pointer to point to the data unit from the first data unit element, and modifying the second pointer to point to the data unit clone from the first data unit element; and
setting an attribute for the first data unit element to indicate that the first data unit element is a new master data unit element.

2. The method of claim 1, further comprising: performing a Copy-on-Write (CoW) operation to modify a clone represented by a non-master data unit element, after excluding the non-master data unit element from the cyclic linked list and allocating another data unit to store a modified clone.

3. The method of claim 1, further comprising: utilizing, by the file system, the cyclic linked list to access the data unit from any data unit element of the cyclic linked list in constant time complexity of O(1), regardless of a size of the cyclic linked list.

4. The method of claim 1, further comprising: upon replacing the master data unit element, associating the auxiliary attribute with the second data unit element that becomes a shadow element for the new master data unit element.

5. The method of claim 1, further comprising: selecting a Split-on-Write operation to modify a clone represented by a non-master data unit element without allocating a new data unit.

6. The method of claim 1, further comprising: selecting a Split-on-Write operation to modify a clone represented by a non-master data unit element, based on a relative location of the non-master data unit element in the cyclic linked list.

7. The method of claim 1, further comprising: selecting a Split-on-Write operation to modify a clone represented by a non-master data unit element, based on a duration to begin moving content associated with the non-master data unit element from the persistent memory to the storage device.

8. The non-transitory storage medium of claim 1, wherein an auxiliary attribute is associated with a first data unit element of the cyclic linked list and a persistent memory location that stores the data unit, the first data unit element pointing to the master data unit element.

9. A non-transitory storage medium having stored thereon instructions for performing a method, comprising machine executable code which when executed by at least one machine, causes the machine to:
use a first pointer by a master data unit element of a cyclic linked list having a plurality of data unit elements to point to a data unit stored in a persistent memory of a computing device, the data unit retaining content of an object accessible to a persistent memory-based file system;
use a second pointer by the master data unit element to point to a data unit clone stored in a storage device;
for replacing the master data unit element:
traverse a portion of the cyclic linked list with non-master data unit elements; and
modify pointers from the non-master data unit elements to point to a new master data unit element, with an attribute to indicate that the new master data unit element is a new master for cyclic linked list; and
for modifying a clone represented by a non-master data unit element of the cyclic linked list:
select between a Copy-on-Write operation or a Split-on-Write operation to modify the clone.

10. The non-transitory storage medium of claim 9, wherein for the Copy-on-Write operation, a new data unit is allocated for storing content of a modified clone.

11. The non-transitory storage medium of claim 9, wherein the file system uses the cyclic linked list to access the data unit from any data unit element of the cyclic linked list in constant time complexity of O(1), regardless of a size of the cyclic linked list.

12. The non-transitory storage medium of claim 9, wherein the Split-on-Write operation either uses a persistent memory location or a storage location in the storage device to store the modified clone, without allocating an additional data unit.

13. The non-transitory storage medium of claim 9, wherein the Split-on-Write operation is selected based on a relative location of the non-master data unit element in the cyclic linked list.

14. The non-transitory storage medium of claim 9, wherein the Split-on-Write operation is selected based on a duration to begin moving content associated with the non-master data unit element from the persistent memory to the storage device.

15. An apparatus, comprising:
a processor and a persistent memory, wherein the processor executes a persistent memory-based file system to access a data unit stored in the persistent memory, the data unit retaining content of an object;
wherein a first pointer of a master data unit element of a cyclic linked list having a plurality of data unit elements points to the data unit in the persistent memory and a second pointer points to a data unit clone stored in a storage device;
wherein an auxiliary attribute is associated with the master data unit element and a first data unit element of the cyclic linked list, the first data unit element points to the master data unit element and to a second data unit element, the second data unit element points to the master data unit element and the first data unit element;
wherein to replace the master data unit element, the processor is configured to:
traverse a portion of the cyclic linked list with non-master data unit elements; and
modify pointers from the non-master data unit elements to point to a new master data unit element, with an attribute to indicate that the new master data unit element is a new master for cyclic linked list.

16. The apparatus of claim 15, wherein to modify a clone represented by a non-master data unit element of the cyclic linked list, the processor is configured to:
select between a Copy-on-Write operation or a Split-on-Write operation to modify the clone; wherein for the Copy-on-Write operation, a new data unit is allocated for storing content of a modified clone, and the Split-on-Write operation modifies the clone without allocating the new data unit.

17. The apparatus of claim 15, wherein the Copy-on-Write operation is performed in response to a store instruction targeting a page derived from a memory mapped system call.

18. The apparatus of claim 15, wherein the persistent memory is a first tier storage and the storage device is a second tier storage, wherein each data unit element comprises a first tier pointer (t1) and a second tier pointer (t2); wherein t1 when not used to point to any data unit, points to a data unit element.

19. The apparatus of claim 15, wherein the Split-on-Write operation is selected based on a duration to begin moving content associated with the non-master data unit element from the persistent memory to the storage device.

20. The apparatus of claim 15, wherein the file system uses the cyclic linked list to access the data unit from any data unit element of the cyclic linked list in constant time complexity of O(1), regardless of a size of the cyclic linked list.

\* \* \* \* \*